Dec. 20, 1960  R. R. ZINDLER  2,965,421
COMBINED BACK-UP THRUST WASHER AND SEAL FOR DISC TYPE
FRICTION DEVICES HAVING ANNULAR HYDRAULICALLY
POWERED OPERATOR PISTONS
Filed July 31, 1959  2 Sheets-Sheet 1

INVENTOR
ROGER R. ZINDLER
BY
ATTORNEYS

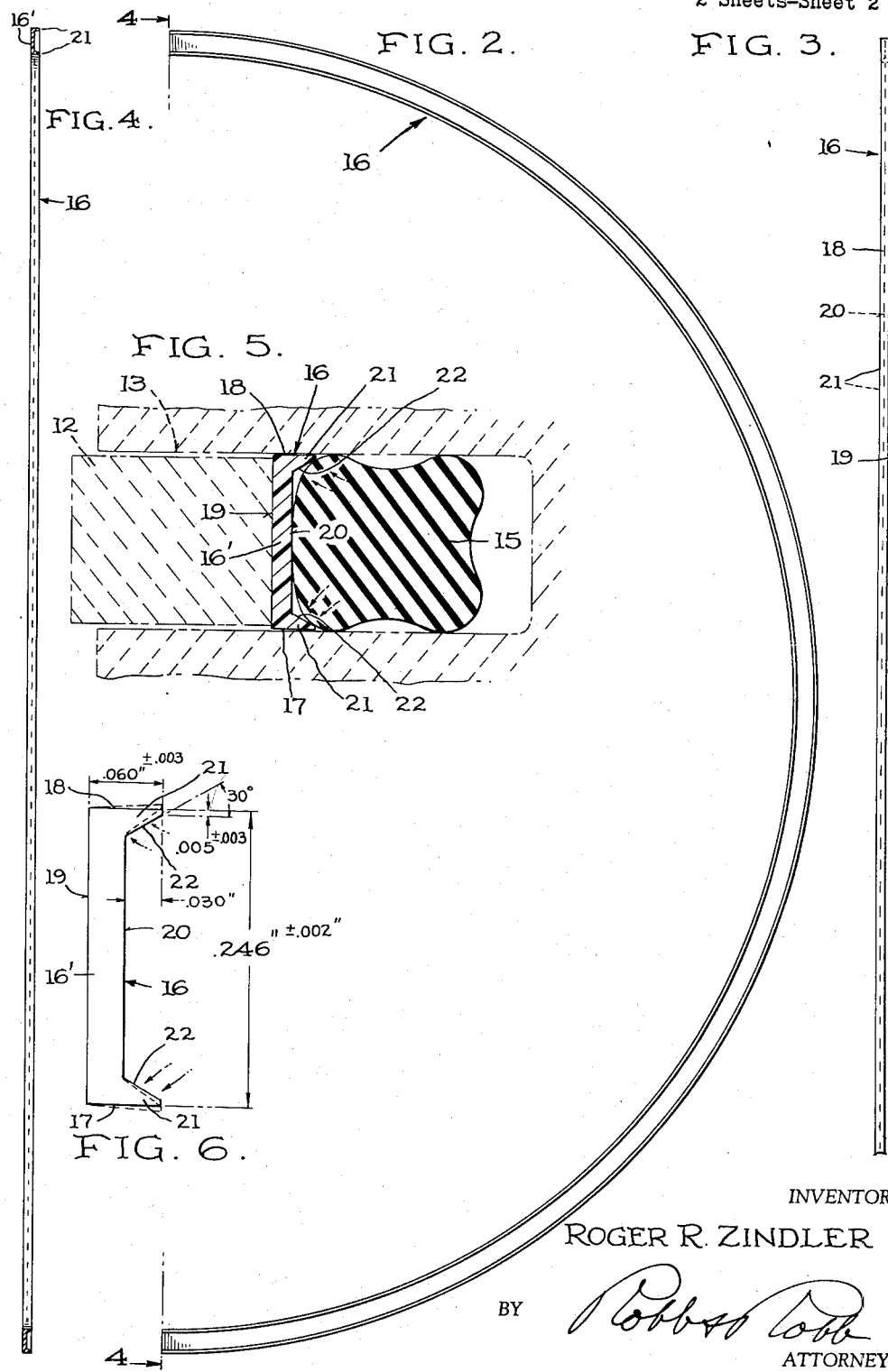

United States Patent Office 2,965,421
Patented Dec. 20, 1960

2,965,421
COMBINED BACK-UP THRUST WASHER AND SEAL FOR DISC TYPE FRICTION DEVICES HAVING ANNULAR HYDRAULICALLY POWERED OPERATOR PISTONS

Roger R. Zindler, St. Joseph, Mich., assignor, by mesne assignments, to Lambert Brake Corporation, St. Joseph, Mich., a corporation of Michigan Filed July 31, 1959, Ser. No. 830,760

3 Claims. (Cl. 309—23)

This invention relates broadly to fluid seals, and more particularly to flexible annular packing seal members which are known in the art as back-up or thrust washers which serve to effect a fluid tight seal between relatively movable elements of various kinds, and more particularly for annular type hydraulic operator pistons for disc brakes and the like, but is not limited thereto.

More specifically, the invention pertains to a flexible annular thrust washer which constitutes an annular sealing member and which is generally of flattened cup-shape or channel-shape in cross-section, having radially spaced sealing lips or flanges projecting laterally from an annular radially-extended connecting wall therebetween, with said lips being provided with diverging inwardly opposed surfaces that are cooperable with a contiguous annular gasket member which exerts a wedging or spreading action thereagainst responsive to an operating pressure fluid, or are equally well suitable for functioning directly responsive to the spreading action exerted by the said pressure fluid.

Accordingly, the invention involves a combined back-up thrust washer and seal which is equally well adapted to both static and dynamic applications, but as described herein, is primarily intended for use as a back-up thrust washer and seal in contiguous association with fluid-pressure-actuated annular pistons as embodied in various disc-type friction devices which utilize hydraulic actuator means of the annular piston type.

In various fluid-actuated disc-type friction devices, including both brakes and clutches of both the non-energized and self-energized form, the friction discs are usually operatively interengaged by means of an annular piston actuator means, which generally comprises an axially shiftable annular actuator piston disposed within a complementary annular piston chamber formed in one of the housing walls. The piston is generally disposed contiguous to an axially movable primary actuator friction disc, and is provided with primary sealing means such as a rubber "O-ring" or a lobed annular sealing member behind the piston within the chamber.

To save on manufacturing costs, as by avoiding the necessity of machining the pistons and their chambers to the normally very close fitting tolerances, it has become an acceptable practice to forego the usual very close fit thereof, and in lieu thereof to employ a generally flat but relatively close fitting thin metal thrust or back-up washer element between the piston and its primary sealing ring to avoid undue wear or pinching of the rubber seal against the looser fitting piston, thus helping to produce a more effective seal.

Although various forms of these thrust or back-up washers have been used, including the flat solid ring type and the split overlapping ring type, none of which I am aware have proven to be completely effective, particularly in regard to use in self-energized or servo-types of friction devices. The primary difficulty resides in the fact that the rubber "O-ring" or other lobed-type sealing members manage to work their way around the outside and inside diameters of the conventional back-up or thrust washers, and as self-energization of the friction device takes place with attendant slight rotation of the actuator piston along with the primary actuator, the sealing member becomes pinched and pieces or chunks of rubber are gouged therefrom. Consequently, the sealing members become mutilated and ineffective after a short period of time, necessitating unduly frequent replacement thereof.

Accordingly, it is the primary objective of this invention to provide an improved annular thrust washer or back-up ring constituting a sealing member with radially spaced sealing lips or flanges which will obviate the foregoing disadvantages.

Another object is to provide an improved thrust washer or annular back-up member for effecting a fluid tight seal between relatively movable members, said improved washer having radially opposed sealing lips and being fabricated of a plastic "Teflon" fiberglass material characterized by a very low coefficient of friction while being stable yet flexible enough to permit said lips to flex responsive to compressive forces so that the ordinarily very precise dimensional tolerances of the relatively movable members with which it is associated are not essential, when used in association with relatively movable members of a predetermined size.

Other objects and advantages will become apparent to those skilled in the art from the following detailed description and the novel features thereof will be defined in the appended claims.

In the drawings:

Fig. 1 is a cross-sectional view of a typical installation of a thrust or back-up washer made in accordance with this invention, this view showing the washer in its operative thrust receiving and auxiliary sealing position intermediate a relatively movable annular actuator piston and its primary sealing ring as disposed within the relatively stationary backing plate of a typical servo disc-type brake assembly;

Fig. 2 is a fragmentary elevational view of a half-segment of the thrust or back-up washer as viewed from its channeled side;

Fig. 3 is a fragmentary side elevational view of the washer of Fig. 2;

Fig. 4 is a cross-sectional view of the washer of Fig. 2 as taken on line 4—4 thereof;

Figure 1:
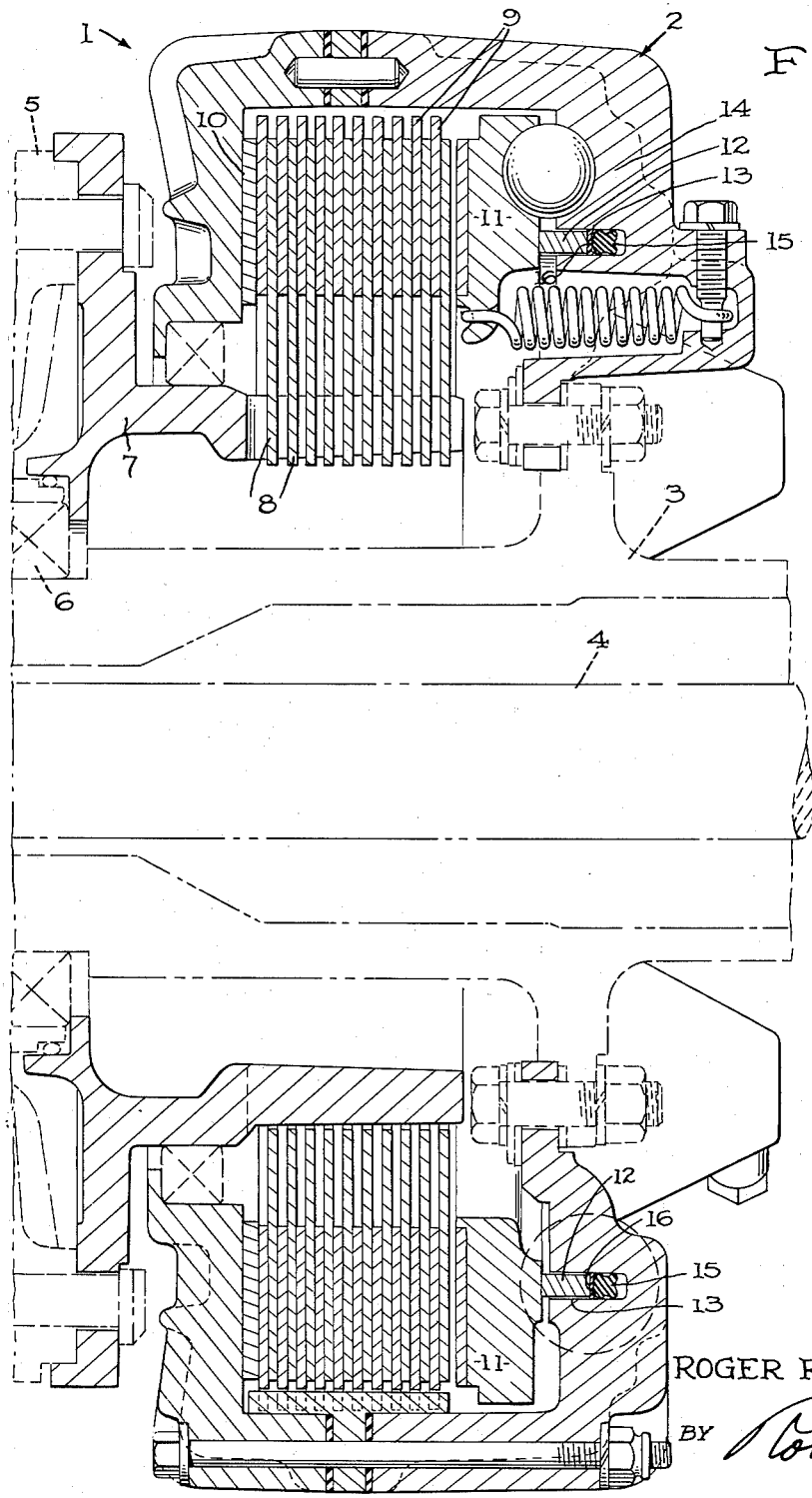

Fig. 5 is a fragmentary sectional view on an enlarged scale, showing the thrust washer in its installed relation to the other elements embraced substantially within the dotted circle of Fig. 1; and Fig. 6 is a diagrammatic view in section on a greatly enlarged scale of the thrust or back-up washer, also showing the sealing lips or flanges in broken lines in the positions they assume responsive to compressive forces (illustrated by the arrows) acting thereagainst, and also giving illustrative relative dimensions and angles of one practical washer as used in a brake having a mean diameter of its friction surfaces of about 13 inches.

Like reference characters denote corresponding parts throughout the several figures of the drawings, wherein 1 generally denotes a well-known type of disc brake construction, including a stationary housing assembly 2 carried by the axle housing 3 of a rotatable drive axle 4. The axle 4 drives a wheel mounting hub 5 (shown fragmentarily) which is journalled upon the axle housing 3 by means of a suitable bearing 6. A brake rotor friction disc driver 7 is suitably secured for rotation with hub 5 and drivingly supports the rotor friction discs 8 within the housing 2, said friction discs 8 being preferably alternately interleaved with a plurality of stator discs 9 carried by the housing assembly 2. Taken together, the rotor and stator discs form an axially shiftable disc pack which is operatively inter-engaged with the inner annular friction face of one side 10 of the housing assembly 2 and with an axially shiftable and slightly rotatable annular primary actuator disc 11 at the other side. The actuator disc 11 is actuated or operated by means of a fluid-pressure-operated annular piston 12 disposed within a complementary annular piston chamber 13 provided in the back-up plate side 14 of the housing assembly 2. Behind the piston 12, a primary sealing means 15 which may be of a well-known resilient lobed annular form is provided to preclude the operating-pressure-fluid from leaking past the piston into the interior of the brake.

In order to reduce manufacturing production costs, it has become a standard practice to provide a thin but relatively close fitting flat metal back-up or thrust washer within the piston chamber 13 intermediate the piston 12 and a primary sealing means 15, in lieu of requiring the otherwise necessary extremely close-fitting machining tolerances on the piston 12 and the chamber 13. While the conventional flat type of washer described above has not been shown, my improved back-up washer and seal, constituting the subject of this invention, is illustrated and designated 16 in Fig. 1 and the other figures of the drawings.

The disc brake construction per se, described only generally in the foregoing, forms no part of the present invention, but is shown merely as being illustrative of one dynamic application of the improved thrust or back-up and sealing washer of this invention.

According to the form of my washer-seal construction illustrated in the drawings, the washer 16 is preferably fabricated by machining or molding it in the form of a unitary integral ring having a radially extended wall 16' with inner and outer peripheral faces, 17 and 18 respectively. Said wall 16' is provided with one smooth radial face 19. The opposite face 20 is generally flatly cupped or channel-shaped in cross-section as defined by a pair of sealing lips or flanges 21, 21, which project laterally at substantially right angles from the inner and outer peripheries of the radial wall portion 16'.

The lips or flanges 21, 21, are radially spaced from each other and have their respective inwardly opposed walls or faces 22, 22, divergingly inclined, each face 22 being disposed approximately at an angle of 30° with respect to the peripheral faces 17 and 18 respectively, of wall 16', as best seen in Figs. 5 and 6.

When in assembled relationship, the flat side or surface 19 of wall 16' abuts against the rear wall of piston 12, while the flattened cup-shaped or channel-shaped side 20 faces the rearward portion of the piston chamber 13. The lips 21, 21, substantially divergingly straddle the inner and outer peripheries of the lobed annular primary seal 15 (best seen in Fig. 5), which is of a special design that enables it to seat against the flat surface 20 between lips 21, 21. Thus, as operating pressure produced by the introduction of hydraulic fluid is increased within chamber 13, forcing the primary seal 15 against back-up washer 16 and piston 12, compressive forces on seal 15 are transmitted to my improved back-up washer 16 constituting it an auxiliary seal herein by forcing the inner and outer tapered annular sealing lips against the cylindrical walls of chamber 13 to take up any clearance therebetween, and thus precluding any extrusion of the rubber or other flexible primary sealing member 15 between the O.D. or the I.D. of the back-up washer 16. It is to be noted that washer 17 is so designed that close fitting tolerances of it are not required due to the diverging character of the inner walls of the flexible lips 21, 21, which are forced outwardly into sealing engagement, as just described hereinabove. Fig. 6 shows, in dotted outline, an illustrative flexed position which the sealing flanges or lips 21, 21, are able to assume responsive to compressive operating forces indicated by the dotted arrows. Fig. 6 further discloses illustrative relative dimensions and angles of one practical back-up washer for use in a disc brake having annular friction surfaces with a mean diameter of 13 inches, the I.D. and O.D. thereof being 11¼ inches and 14¾ inches, respectively.

It is also contemplated that my improved thrust or back-up washer 16 is equally well suited for service as a combined primary or principal sealing member and back-up washer, apart from its auxiliary sealing functions as illustratively shown and described, isasmuch as the flexible sealing lips 21, 21 will readily function in the same manner directly responsive to the forces of the operating pressure fluid.

Among the salient features of this invention, is the utilization of a "Teflon"-fiberglass commercially available plastic compound, in lieu of a metal such as steel, from which my improved back-up washer is fabricated. One practical and preferred composition comprises 85% virgin "Teflon" in combination with 15% fiberglass, the latter of which is added to give more stability to the "Teflon" material by reducing the expansion and shrinkage characteristics thereof. By use of this plastic material, it affords the necessary resilience to permit proper flexing of sealing lips 21, 21, while at the same time providing a material inherently having an extremely low coefficient of friction, as well as excellent-resistant characteristics. Due to the latter characteristic, a thrust or back-up washer fabricated from this material will also act as a heat insulator and prevent overheating of the hydraulic operating fluid.

While a preferred embodiment of my improved back-up or thrust washer and seal has been shown and described in detail, other changes and alterations may be made without departing from the spirit thereof as defined in the appended claims.

I claim:

1. A composite packing seal for annular hydraulic piston operators for friction devices of the disc type in which the operator piston is disposed within an annular piston chamber, comprising a plurality of cooperative annular sealing members adapted to be disposed in concentric abutting relation to each other within the piston chamber aforesaid, with one end of the composite seal exposed completely and directly to a fluid pressure medium for imparting an axial thrust thereto, one of said members having a pair of radially spaced relatively flexible sealing lips extended axially therefrom toward the other member, said lips having inwardly opposed axially inclined annular faces, and said other member being composed of resilient material provided with at least one convexly flattened radially extended face merging into lobed inner and outer peripheral faces, said radially extended face being seated between the lips of the first-mentioned member and cooperating with the lips to spread the lips apart responsive to the application of an axial thrust against the second member.

2. A composite packing seal as defined in claim 1, and wherein the second member is generally rectangular in radial cross-section, with each of its other faces being concave at their respective mid-portions and thereby defining generally symmetrical lobed peripheral sealing edges.

3. A composite packing seal as defined in claim 1, wherein the first-mentioned member is composed of a "Teflon"-fiberglass plastic material comprising substantially 85% virgin "Teflon" and 15% fiberglass.

References Cited in the file of this patent

UNITED STATES PATENTS

| | | |
|---|---|---|
| 2,705,177 | Waring | Mar. 29, 1955 |
| 2,730,202 | DuBois | Jan. 10, 1956 |
| 2,814,540 | Sautherwick | Nov. 26, 1957 |
| 2,832,654 | Carufel | Apr. 29, 1958 |
| 2,843,434 | Orloff et al. | July 15, 1958 |
| 2,884,292 | Doner | Apr. 28, 1959 |

OTHER REFERENCES

"Thermosetting Plastic Laminates—I," Product Engineering, December 1948.

The Chemical Age, "Plastic Uses of Diallyl Phthalate" pp. 226 and 228, published February 11, 1950.